(12) United States Patent
Xiong (10) Patent No.: US 6,947,550 B2
(45) Date of Patent: Sep. 20, 2005

(54) ACOUSTIC ECHO CANCELLATION

(75) Inventor: Ying Xiong, San Jose, CA (US)

(73) Assignee: InnoMedia PTE Ltd., The Alpha (SG)

( * ) Notice: Subject to any disclaimer, the term of this patent is extended or adjusted under 35 U.S.C. 154(b) by 367 days.

(21) Appl. No.: 10/135,715

(22) Filed: Apr. 30, 2002

(65) Prior Publication Data

US 2003/0202654 A1 Oct. 30, 2003

(51) Int. Cl.[7] ............................................... H04M 1/00
(52) U.S. Cl. .......................... 379/406.05; 379/406.06; 379/406.07; 379/406.01
(58) Field of Search ....................... 379/406.01, 406.05, 379/406.06, 406.07, 406.02, 406.03, 406.08, 406.09

(56) References Cited

U.S. PATENT DOCUMENTS 6,377,682 B1 * 4/2002 Benesty et al. ........ 379/406.01

2004/0252826 A1 * 12/2004 Tian et al. ............. 379/406.08

* cited by examiner

Primary Examiner—Jefferey F. Harold
(74) Attorney, Agent, or Firm—Renner, Otto, Boisselle & Sklar, LLP (57) ABSTRACT

The invention is an echo canceller for reducing the magnitude of an echo occurring in a return channel of a communication device and a method of implementing the same. The echo canceller includes a processing unit for generating an echo attenuated signal. The processing unit includes a first input, a second input and an output. The first input is for receiving a first signal that is the precursor of the echo. The second input is for receiving a second signal that potentially contains the echo. The output is for outputting the echo attenuated signal. The echo attenuated signal is derived by combining the second signal and an adaptation signal. The adaptation signal is generated by normalizing the echo attenuated signal to produce a normalized adaptation signal, and combining the normalized adaptation signal with the first signal to generate an intermediate signal. Additionally, the intermediate signal is de-normalized to produce the adaptation signal.

26 Claims, 3 Drawing Sheets

FIG. 7

ACOUSTIC ECHO CANCELLATION

TECHNICAL FIELD

The present invention generally relates to an adaptive acoustic echo cancelling device for communication networks. In particular, the present invention relates to an improved acoustic echo cancellation and a method for implementing the same.

BACKGROUND

In a typical telephone network, two types of echoes may be present: acoustical echo and electrical echo. Acoustical echo may occur in a telecommunication network when a hands-free telephone terminal is used. The speech signal generated from the speaker in the terminal propagates in the form of an acoustic wave through an acoustic environment (air) and part of it is reflected back into the microphone of the terminal. This reflected signal will be transmitted back to the talker thereby creating an echo. In some instances, an acoustical echo may occur in a telephone with poor voice coupling between the earphone and the microphone. Therefore, two different components may make up the acoustical echo. The first is the undesired remote speech reflected from the roof, windows and walls, and the second is the direct coupling between the loudspeaker and the microphone. The echo from the first component could be delayed as long as 200 milliseconds.

An electrical echo results from the presence of a hybrid converter that is required to connect a unidirectional four wire link from a public switched telephone network (PSTN) to a local two wire loop. The basic function of the hybrid converter is to separate the transmitted signal originating in the local loop from the received signal in the PSTN section, and vice versa. This process requires the energy of the received signal to pass filly in the local loop. However, due to an impedance mismatch in the hybrid converter, part of the received energy is reflected back to the transmitting port. As a result, a talker hears his own delayed speech which, of course, is undesirable.

One approach for echo reduction in communication networks is to use echo suppressors. A typical echo suppressor acts like a switch that monitors the voice signals traveling in both directions. It detects which person is talking and blocks the signal traveling in the opposite direction. The drawback of such an echo suppressor is that the echo suppressor tends to "chop" speech signals when the users talk back and forth quickly due to the response time for monitoring the speech activities. Moreover, during double talk, i.e., when the users talk simultaneously, the suppressor fails to control the echo.

One proposed solution to avoid the problems of echo suppressors is to provide circuitry or an algorithm that, instead of blocking speech signals in one direction in the communication link, cancels the echo by using an adaptive filter. An adaptive filter is a computational device that attempts to model the relationship between two signals in real time in an interactive manner. Adaptive filters are well accepted in communication systems, for echo cancellation and line equalization. The adaptive filter is based on convolution. The most frequently used structure of an adaptive filter is the finite-impulse-response (FIR) filter.

An adaptive filter can be implemented as an open-loop filter or a closed-loop filter. In a closed-loop filter, an algorithm operates in an iterative manner and updates the adjustable parameters with the arrival of new data and current-signal performance feedback parameters. During each iteration, the system learns more about the characteristics of the input signal. The processor makes adjustments for the current set of parameters based on the latest system performance, i.e., the error signal e(n). The optimum set of values of the adjustable parameters is thus approached sequentially.

Figure 1:
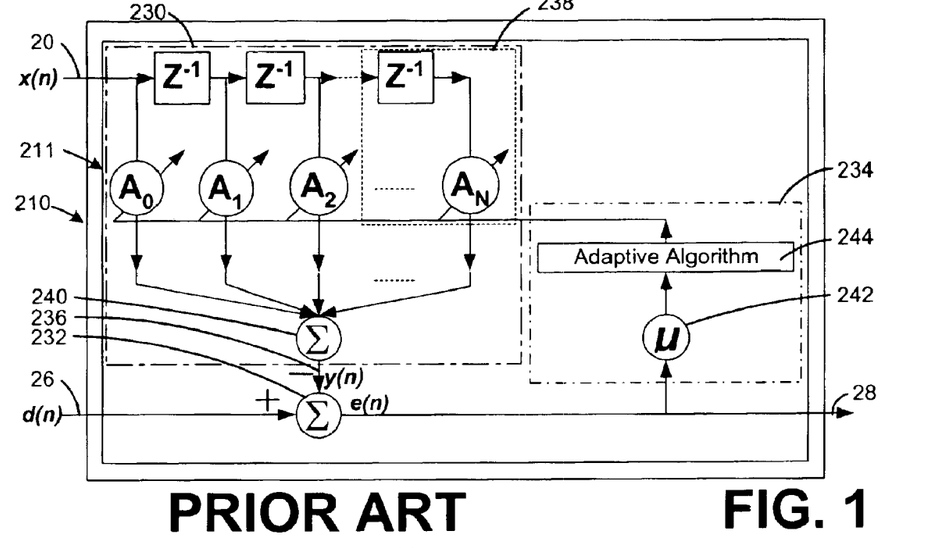
FIG. 1 is an electrical block diagram of an adaptive echo cancelling device of the prior art.

FIG. 1 shows a block diagram of a conventional (prior art) adaptive echo cancelling device designated 210. One input of the adaptive echo cancelling device 210 is a far-end input signal x(n) 20. In this figure, the far-end input signal x(n) 20 may be from a far-end terminal, such as a telephone, cell phone, Voice over IP phone or the like. The far-end input signal x(n) 20 is the discrete-time signal used to drive a loudspeaker in a hands-free near-end terminal (not shown).

Another input of the adaptive echo cancelling device 210 is a near-end input signal d(n) 26. The near-end input signal d(n) 26 is the signal picked up by the microphone (not shown) of the hands-free near-end terminal. The near-end input signal d(n) 26 contains a portion of the far-end input signal x(n) 20 in the form of an echo, background noise, and possibly, local speech.

The output of the adaptive echo cancelling device 210 is the output/error signal e(n) 28 which is output to the far-end. The adaptive echo cancelling device 210 may include a loss controller, a non-linear processor, a supplementary howling control device or the like (not shown) to further process the output/error signal e(n) 28 output to the far-end.

The adaptive echo cancelling device 210 includes an adaptive FIR filter 211. The adaptive FIR filter 211 includes a main FIR component 230, an adder 232 and an update step-size control 234. The adaptive FIR filter 211 also includes inputs for receiving the far-end input signal x(n) 20 and the near-end input signal d(n) 26. The adaptive FIR filter 211 outputs the output/error signal e(n) 28 which may be output directly to the far-end or further processed by one of the components mentioned above.

The main FIR component 230 uses the far-end input signal x(n) 20 as a reference signal. The main FIR component 230 outputs an estimated echo signal y(n) 236. As mentioned above, the main FIR component 230 is based on convolution.

The main FIR component 230 also includes multiple delay units denoted by $Z^{-1}$ in the figure. The far-end input signal x(n) 20 is coupled to an input of a first delay unit. An output of the first delay unit is coupled to an input of a second delay unit. An output of the second delay unit is coupled to an input of a subsequent delay unit. An output of the subsequent delay unit is coupled to an input of another subsequent delay unit (not shown). A last delay unit receives the output of the previous delay unit in the series as its input. The number of delay units depends on the number of taps in the adaptive FIR filter 211. The number of delay units is the number of taps minus one.

The main FIR component 230 also includes multiple multipliers denoted by a circle containing the symbol for a tap coefficient (e.g., $A_x$). The far-end input signal x(n) 20 is also coupled to an input of a first multiplier. The output of the first delay unit is also coupled to an input of a second multiplier. The output of the second delay unit is also coupled to an input of a subsequent multiplier. The output of each subsequent delay unit is also coupled to an input of each subsequent multiplier (not shown), respectively. The output of the last delay unit is coupled to an input of the last multiplier. The number of multipliers also depends on the number of taps. The number of taps equals the number of multipliers. Each multiplier has a second input. The respective component of an updated tap coefficient vector A(k), as further described below, is coupled to the second input on each respective multiplier.

As mentioned above, the main FIR component 230 includes multiple taps. The computing step enclosed in a dash-line block 238 (hereinafter "the filter tap 238") is an example of a tap. One input of the filter tap 238 is the far-end input signal x(n) 20. In this example, the delayed output of the far-end input signal x(n) 20 from the previous delay unit in the series of delay units is the input to the last delay unit. Another input of the filter tap 238 is the updated tap coefficient $A_N$ output by the update step-size control 234. Specifically, the updated tap coefficient $A_N$ is input into an input of the last multiplier. The output of the last delay unit is fed into the other input of the last multiplier. The last multiplier multiplies the output of the last delay unit by the updated tap coefficient $A_N$. The output of the last multiplier is the tap output. Thus, the filter tap 238 includes both a step of convolution and a step of coefficient adaptation.

The outputs of the taps are coupled to multiple inputs of an adder 240. The output of the adder 240 is the estimated echo signal y(n) 236. The output of the adder 240 (i.e., estimated echo signal y(n) 236) is coupled to a negative input of the adder 232. The near-end input signal d(n) 26 is coupled to a positive input of the adder 232.

The adder 232 compares the near-end input signal d(n) 26 to the estimated echo signal y(n) 236 and outputs the output/error signal e(n) 28. Thus, the output/error signal e(n) 28 is the difference between the near-end input signal d(n) 26 and the estimated echo signal y(n) 236 of the main FIR component 230. The output/error signal e(n) 28 is output by the adaptive FIR filter 211 to the far-end.

The output/error signal e(n) 28 is also fed back to the main FIR component 230 via the update step-size control 234. The update step-size control 234 includes a multiplier 242 and an adaptive coefficient algorithm 244. The output/error signal e(n) 28 is input into an input of the multiplier 242. The output of the multiplier 242 is input into an input of the adaptive coefficient algorithm 244. The output of the adaptive coefficient algorithm 244 is the updated tap coefficient vector A(k). Thus, the update step-size control 234 outputs the updated tap coefficient vector defined as A(k)=[$A_0$, $A_1$, $A_2$ ... $A_N$].

The multiplier 242 includes a step size factor represented by $\mu$. The step size $\mu$ is usually a small positive constant. It should be understood by those skilled in the art that a variable step size $\mu$ could be used. There may be some situations when the adaptive coefficient updates of the taps need to be stopped. For example, the adaptive coefficient updates of the taps may need to be stopped when a local speech signal is present. In this case, the step size $\mu$ may be mathematically reflected as being set to 0. This has the effect of temporarily disabling the adaptive function.

Thus, in the conventional adaptive FIR filter 211 x(n), d(n) and e(n) denote the far-end input signal x(n) 20, the near-end input signal d(n) 26 and the output/error signal e(n) 28, respectively. The adaptive FIR filter 211 is excited by the far-end input signal x(n) 20 and driven by an adaptive algorithm (e.g., a normalized least mean square algorithm (NLMS or LMS)) to produce the estimated echo signal y(n) 236 or replica of the echo signal. The error signal e(n) 28 is then obtained by subtracting this estimated echo signal y(n) 236 from the near-end input signal d(n) 26 and can be expressed as follows:

$$e(n) = d(n) - \left[\sum_{k=0}^{N-1} A(k)x(n-k)\right]$$

and the adaptive algorithm (i.e., when using the LMS algorithm) of the tap coefficient vector update equation can be expressed as follows:

$$A_{new}(k) = A_{old}(k) + \mu e(n) \times (n-k), k=0, \ldots, N$$

where A(k) denotes the coefficient vector for the taps and $\mu$ is the step size. It is understood by those skilled in the art that the convergence factor is denoted by $\mu e(n)$ (i.e., the step size $\mu$ multiplied by the output/error signal e(n)).

When the output signal e(n) 28 is not close to the near-end input signal d(n) 26, the adaptation algorithm will be executed to correct or update the tap coefficients so that the estimated echo signal y(n) 236 will gradually approach the near-end input signal d(n) 26 (i.e., the desired signal). The near-end input signal d(n) 26 is unknown and changes all the time. Therefore, the adaptive FIR filter 211 has to be a real time closed loop feedback system adapting all the time to follow the definition of the near-end input signal d(n) 26.

In a high quality adaptive filter, the coefficient set is adapted all the time and therefore costs a lot in terms of computing power. Thus, an adaptive filter becomes expensive in terms of computing power.

As mentioned above, one example of the adaptive algorithm is the LMS algorithm. The LMS algorithm is the most popular adaptation algorithm, however, other adaptive algorithms may be used. Additionally, the LMS algorithm may make use of the steepest descent approach. The LMS algorithm derives the estimation of the gradient vector based on a limited number of data samples.

Further, the adaptation algorithm may include convergence control in addition to coefficient adaptation. Convergence control is not performed in every tap in order to reduce the cost of the computing power. On the other hand, coefficient adaptation is usually performed on all taps during each sample for a high performance adaptive filter. Thus, most of the computing power of the adaptive filter is consumed when performing the coefficient adaptation.

Early echo cancellation implementations were based on analog circuit technique. However, analog technique was unable to follow adequately the changes in the room environment. Therefore, echo cancellation is now typically done using digital technique. A digital echo canceller is an adaptive FIR filter with long tap size.

The number of taps in a long tap adaptive FIR filter may be more than 3200, for example, for a 200 ms echo canceller used in a 16 kHz sampling-rate ISDN telephone system. This means that at least 7200 Multiply Accumulate (MAC) operations are required in every sample. This includes 3200 MAC operations for the convolution and 3200 MAC operations for the coefficient adaptation. This is equivalent to 102.4 Million Instructions Per second (MIPs). Including other associated computing and control operations, the total number of MIPs could be more than 110 MIPs. One way to decrease the number of MIPs is to skip part of the adaptation computing, which yields relatively low adaptation quality.

In typical digital acoustic echo cancellation, a long tap adaptive FIR filter is used to simulate the echo environment in order to subtract the echo from the near-end input signal, as described above. Usually the taps of the tail component have rather low envelope amplitude compared with the taps of the header component since the echo energy will attenuate with distance. In a finite precision (i.e., fix-point) implementation, the coefficient adaptation of the taps of the tail component become inefficient since the precision of the coefficients is too low. Although double precision algorithms can be adopted, these algorithms will significantly increase the computational complexity.

For example, in a low cost implementation of acoustic echo cancellation, the voice signal and the FIR taps are represented by 16 bit fix point data. If the taps of the tail component contain only 3–4 bits of effective data, the updating or adaptation of the taps of the tail component is very inefficient. If double precision is used to store the taps, the MIPs of the tap adaptation will be doubled. Further, the higher bits in the memory of the taps of the tail component are wasted.

Therefore, there exists a strong need in the art for an improved adaptive echo cancelling device, particularly well suited for use during a communication session involving at least one hands-free telephone terminal.

SUMMARY OF THE INVENTION

The invention includes adding segment weightings to an adaptive FIR filter used in acoustic echo cancellation. Specifically, segment weightings are added to updated tap coefficients in an update step-size control of the adaptive FIR filter. Additionally, segment weightings are added to the outputs of the taps in a main FIR filter portion of the adaptive FIR filter.

Since the envelope amplitude of the taps of the tail component are lower than the taps of the head component, the taps can be separated into a few segments and stored in memory in different precision ranges. Thus during the adaptive updating of the tap coefficients, weightings may be added to the taps of each segment to reflect the taps storage change. The weightings added to the taps of each segment may be tailored to increase the precision of that segment. For example, the weightings added to the taps of the tail component segment(s) may be proportionately greater than the weightings added to the taps of the head component segment(s).

The proportionately greater weightings added to the taps of the tail component increase the virtual amplitude of the taps of the tail component. Specifically, the precision of the coefficients of the taps of the tail component is increased, so that the coefficient adaptation of the tap coefficients becomes more efficient.

As a result of adding segment weightings to the updated tap coefficients in the update step-size control, segment weightings are added in the main FIR of the adaptive FIR filter to the rescale the processed far-end signal back to the original scale. Specifically, segment weightings are added to the tap outputs in the main FIR of the adaptive FIR filter to rescale the processed far-end signal to the original scale. Additionally, the segment weightings added in the main FIR remove the proportionately greater weightings added to the tap coefficients of the tail component segments. The summation of the rescaled tap outputs is the estimated echo signal y(n). The estimated echo signal y(n) is the output of the main FIR component of the adaptive FIR filter.

Additionally by partitioning the taps into a few segments, the additional weightings can be implemented efficiently without adding too much complexity to the algorithm of a conventional adaptive FIR filter. Furthermore, the adaptive step size can be fine-tuned to determine the best adaptive step size for individual segments in order to obtain the fastest convergence.

Thus, the aim of these two segment weightings is to increase the virtual amplitude or the precision of the coefficients the taps of the tail component relative to the previous known tap amplitude envelope without significantly increasing the computational complexity of the whole algorithm. Therefore, the overall performance, including the echo return loss and the convergence speed of the echo canceller, is improved.

According to one aspect of the invention, the invention is an echo canceller for reducing the magnitude of an echo occurring in a return channel of a communication device. The echo canceller includes a processing unit for generating an echo attenuated signal. The processing unit includes a first input, a second input and an output. The first input is for receiving a first signal that is the precursor of the echo. The second input is for receiving a second signal that potentially contains the echo. The output is for outputting the echo attenuated signal. The echo attenuated signal is derived by combining the second signal and an adaptation signal. The adaptation signal is generated by normalizing the echo attenuated signal to produce a normalized adaptation signal, and combining the normalized adaptation signal with the first signal to generate an intermediate signal. Additionally, the intermediate signal is de-normalized to produce the adaptation signal.

According to another aspect of the invention, the invention is a method for reducing the magnitude of an echo occurring in a return channel of a communication device. The method includes the step of generating an echo attenuated signal. The step of generating an echo attenuated signal includes the steps of receiving a first signal that is the precursor of the echo through a first input and receiving a second signal that potentially contains the echo from a second input. The method further includes the step of outputting the echo attenuated signal from an output. The method also includes the step of combining the second signal and an adaptation signal to derive the echo attenuated signal. Additionally, the method includes the steps of generating the normalized adaptation signal, and de-normalizing an intermediate signal to produce the adaptation signal.

The proportionally greater weightings added to the taps coefficient of the tail component of the error signal increase the precision of the taps of the tail component relative to the head component. The segment weightings, added to the outputs of the taps prior to outputting the estimated echo signal y(n), rescale the estimated echo signal y(n) to account for the weightings added in the update step-size control of the adaptive FIR filter. Thus, the precision of the coefficients of the taps for the tail component is increased without significantly increasing the complexity of the algorithm. Therefore, the overall performance, including the reduction of the echo in the return channel and the convergence speed of the echo canceller, is improved.

To illustrate the present invention in a clear and concise manner, the drawings may not necessarily be to scale and certain features may be shown in somewhat schematic form.

In the detailed description that follows, similar components in the different embodiments illustrated will have a similar reference numeral incremented by 100. For example, in a first embodiment, the telecommunication network is assigned reference number 14. In a subsequent embodiment the telecommunication network is assigned reference number 114, although the telecommunication network may have a different function in the different embodiment. For sake of brevity, in-depth descriptions of similar components may be omitted from descriptions of subsequent embodiments.

DETAILED DESCRIPTION

The present invention provides an improved echo cancelling device that is particularly well suited for use in communication networks where an echo occurs as a result of an acoustic feedback taking place at one end of the communication link (acoustical echo).

Figure 2:
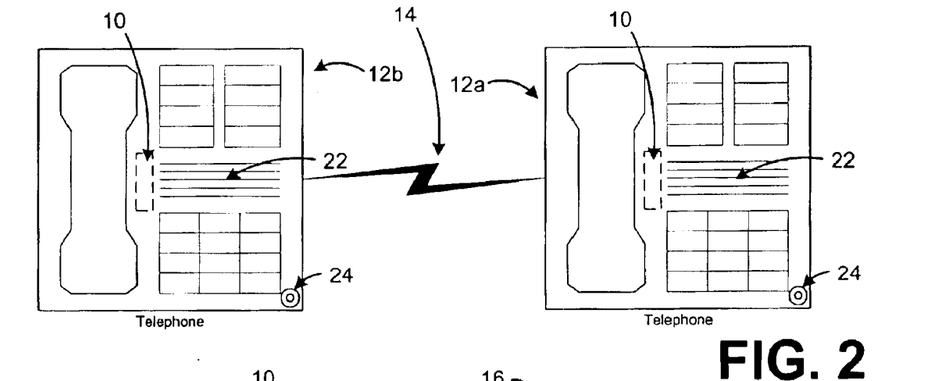
FIG. 2 is a schematic diagram of a telecommunication network, including a hands-free telecommunication terminal featuring the adaptive echo cancelling device in accordance with the invention.
Figure 3:
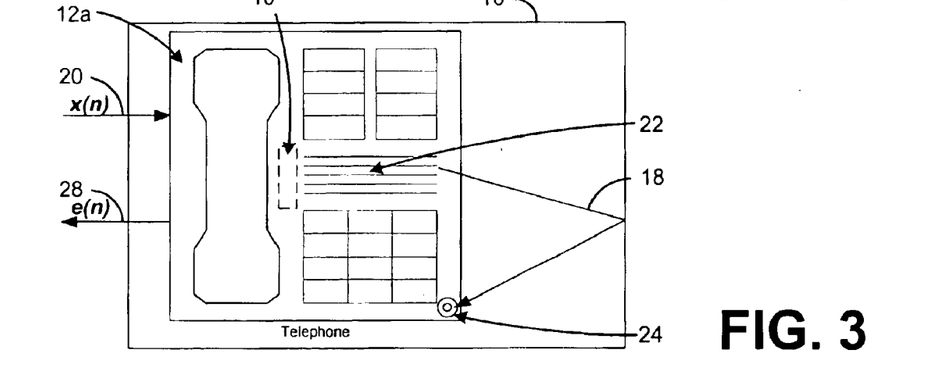
FIG. 3 is a more detailed schematic diagram of the hands-free telecommunication terminal featuring the adaptive echo cancelling device in accordance with the invention.
Figure 4:
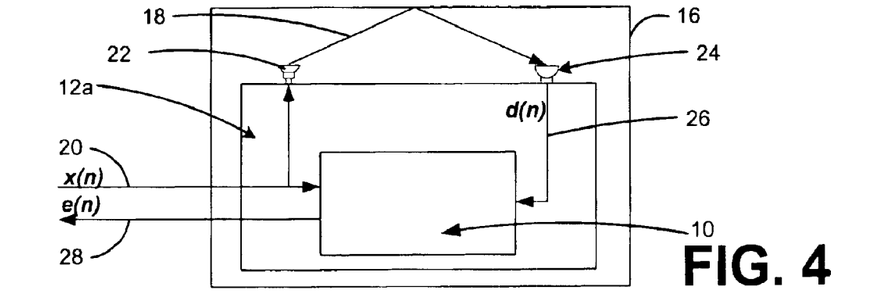
FIG. 4 is a functional block diagram of a hands-free telecommunication terminal featuring the adaptive echo cancelling device in accordance with the invention.

FIGS. 2–4 illustrate an exemplary embodiment for an adaptive echo cancelling device 10. In this exemplary embodiment, the adaptive echo cancelling device 10 is located within a telecommunication terminal 12a, for example. The telecommunication terminal 12a may be a plain old telephone (POT), a VoIP (Voice-over Internet Protocol) phone, a cell phone, or the like. The telecommunication terminal 12a is part of a telecommunication network 14. It should be understood by those skilled in the art that the telecommunication network 14 may be a PSTN network, a VoIP network, a wireless network, or the like.

The telecommunication terminal 12a may be placed in a room 16 (illustrated in FIGS. 2–3) where an acoustical echo path 18 is present. The adaptive echo cancelling device 10 receives a far-end input signal x(n) 20 from a far-end terminal 12b. The far-end input signal x(n) 20 is also supplied to a loudspeaker 22 output of the telecommunication terminal 12a in order that a user may hear the other party. The resulting sound wave that is generated by the loudspeaker 22 will be reflected off the walls and other objects (i.e., the sound wave takes the acoustical echo path 18) in the room 16 and be picked up by a microphone 24 coupled to the telecommunication terminal 12a.

Thus, the reflected sound wave will be fed back to the telecommunication terminal 12a as part of a near-end input signal d(n) 26 (illustrated in FIG. 3) originating from the microphone 24. The microphone 24 sends the near-end input signal d(n) 26 to the adaptive echo cancelling device 10 which removes as much of the echo as possible and sends an output signal/error signal e(n) 28 to the far-end terminal 12b. Ideally, this output signal/error signal e(n) 28 should be as echo free as possible.

Figure 5:
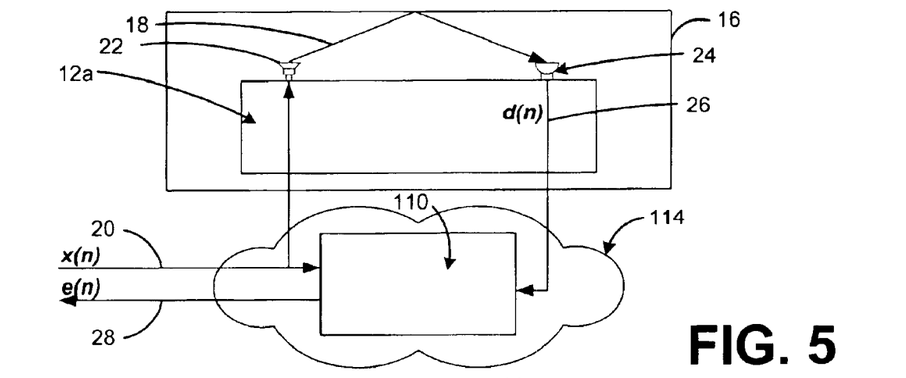
FIG. 5 is a variant of the embodiment shown in FIG. 4.

FIG. 5 illustrates another embodiment for an adaptive echo cancelling device 110. In this case, the adaptive echo cancelling device 110 is located within a telecommunication network 114, outside the telecommunication terminal 12a. The signal path, however, is the same as described above in relation to FIG. 4. The exemplary embodiment shown in FIG. 5 may be preferable in some circumstances because one adaptive echo cancelling device 110 may be designed to service more than one voice channel. This results in better utilization of resources by comparison to the exemplary embodiment depicted in FIGS. 3–4, where each telecommunication terminal (i.e., telecommunication terminal 12a and telecommunication terminal 12b, for example) is provided with the dedicated adaptive echo cancelling device 10.

Figure 6:
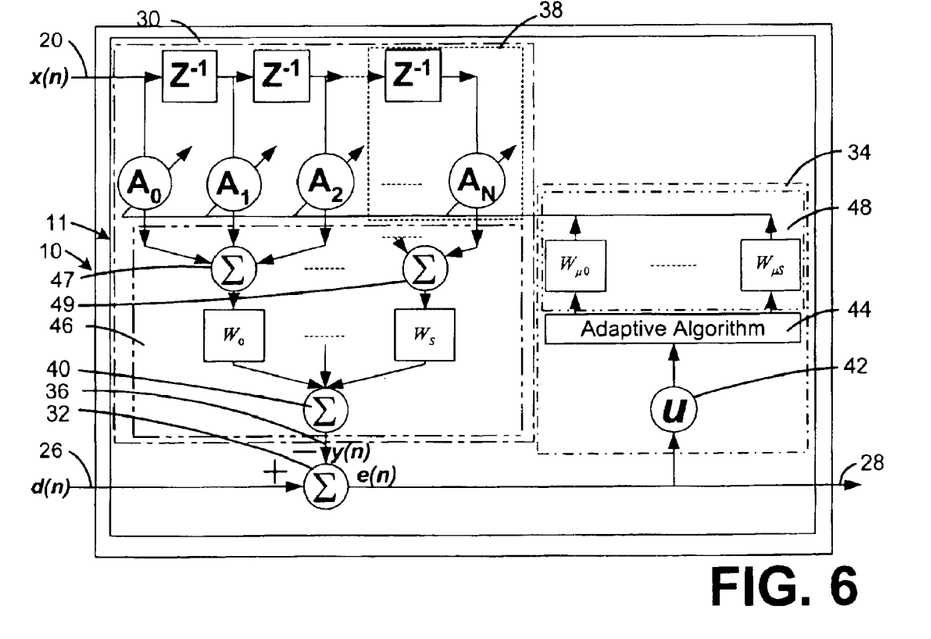
FIG. 6 is an electrical block diagram of the adaptive echo cancelling device in accordance with the invention.

FIG. 6 shows a block diagram of an adaptive echo cancelling device of the present invention generally designated 10. One input of the adaptive echo cancelling device 10 is a far-end input signal x(n) 20. The far-end input signal x(n) 20 may be from a far-end terminal, such as a telephone, cell phone, VoIP phone, or the like. The far-end input signal x(n) 20 is the discrete-time signal used to drive a loudspeaker 22 in a hands-free near-end terminal 12a (illustrated in FIGS. 3–5, for example).

Another input of the adaptive echo cancelling device 10 is a near-end input signal d(n) 26. The near-end input signal d(n) 26 is the signal picked up by the microphone 24 (illustrated in FIGS. 3–5, e.g.) of the hands-free near-end terminal 12a. The near-end input signal d(n) 26 contains a portion of the far-end input signal x(n) 20 in the form of an echo, background noise, and possibly, local speech.

The output of the adaptive echo cancelling device 10 is the output/error signal e(n) 28 which is output to the far-end terminal 12b. The adaptive echo cancelling device 10 may include a loss controller, a non-linear processor, a supplementary howling control device or the like (not shown) to further process the output/error signal e(n) 28 output to the far-end terminal 12b.

The adaptive echo cancelling device 10 includes an adaptive FIR filter 11. The adaptive FIR filter 11 includes a main FIR component 30, an adder 32 and an update step-size control 34. The adaptive FIR filter 11 also includes inputs for receiving the far-end input signal x(n) 20 and the near-end input signal d(n) 26. The adaptive FIR filter 11 outputs the output/error signal e(n) 28 which may be output directly to the far-end or further processed by one of the components mentioned above.

The main FIR component 30 uses the far-end input signal x(n) 20 as a reference signal. The main FIR component 30 outputs an estimated echo signal y(n) 36. The main FIR component 30 is based on convolution.

The main FIR component 30 also includes multiple delay units denoted by $Z^{-1}$ in the figure. The far-end input signal x(n) 20 is coupled to an input of a first delay unit. An output of the first delay unit is coupled to an input of a second delay unit. An output of the second delay unit is coupled to an input of a subsequent delay unit. An output of the subsequent delay unit is coupled to an input of another subsequent delay unit (not shown). A last delay unit receives the output of the previous delay unit in the series as its input. The number of delay units depends on the number of taps in the adaptive FIR filter 11. The number of delay units is the number of taps minus one.

The main FIR component 30 also includes multiple multipliers denoted by a circle containing the symbol for a tap coefficient (e.g., $A_x$). The far-end input signal x(n) 20 is also coupled to an input of a first multiplier. The output of the first delay unit is also coupled to an input of a second multiplier. The output of the second delay unit is also coupled to an input of a subsequent multiplier. The output of each subsequent delay unit is also coupled to an input of each subsequent multiplier (not shown), respectively. The output of the last delay unit is coupled to an input of the last multiplier. The number of multipliers also depends on the number of taps. The number of taps equals the number of multipliers. Each multiplier has a second input. The respective component of an updated tap coefficient vector A(k), as further described below, is coupled to the second input on each respective multiplier.

As mentioned above, the main FIR component 30 includes multiple taps. The computing step enclosed in a dash-line block 38 (hereinafter "the filter tap 38") is an example of a tap. One input of the filter tap 38 is the far-end input signal x(n) 20. In this example, the delayed output of the far-end input signal x(n) 20 from the previous delay unit in the series of delay units is the input to the last delay unit. Another input of the filter tap 38 is the updated tap coefficient $A_N$ output by the update step-size control 34. Specifically, the updated tap coefficient $A_N$ is input into an input of the last multiplier. The output of the last delay unit is fed into the other input of the last multiplier. The last multiplier multiplies the output of the last delay unit by the updated tap coefficient $A_N$. The output of the last multiplier is the tap output. Thus, the filter tap 38 includes both a step of convolution and a step of coefficient adaptation.

The main FIR component 30 also includes a segment weighting unit 46. The taps are partitioned into segments. The number of taps may be 1600, for example. The taps may be partitioned into four segments, for example. The tap outputs need not be evenly distributed among the segments. For example, the 1600 taps may be partitioned among the four segments as follows: 0–31, 32–127, 128–383, and 384–1599. Thus, the number of taps that represent a particular component can be tailored to the resolution sought of the particular component.

The tap outputs of each segment (i.e., 0–31, 32–127, 128–383, and 384–1599) are input into the multiple inputs of the respective adders (only two of which are shown, adder 47 and adder 49). The adders 47 and 49 sum the inputs of the taps. The outputs of the adders 47 and 49 are input to the respective segment weighting blocks.

The segment weighting blocks are denoted by $W_{(x)}$ in the figure. Each segment weighting block multiplies the sub-summated output of the segment by the segment weighting to rescale the segment to its original amplitude. In essence, the segment weighting in the main FIR component 30 removes the segment weighting added in the update step-size control 34. The segment weighting for each segment weighting block of the main FIR component 30 may be as follows: 1, 1/4, 1/16, and 1/64.

The outputs of the each segment weighting block are coupled to multiple inputs of an adder 40. The adder 40 sums the inputs. The output of the adder 40 is the estimated echo signal y(n) 36. Thus, the outputs of each segment weighting block are summated to produce the estimated echo signal y(n) 36. The output of the adder 40 (i.e., estimated echo signal y(n) 36) is coupled to a negative input of the adder 32. The near-end input signal d(n) 26 is coupled to a positive input of the adder 32.

The adder 32 compares the near-end input signal d(n) 26 to the estimated echo signal y(n) 36 and outputs the output/error signal e(n) 28. Thus, the output/error signal e(n) 28 is the difference between the near-end input signal d(n) 26 and the estimated echo signal y(in) 36 of the main FIR component 230. The output/error signal e(n) 28 is output by the adaptive FIR filter 11 to the far-end.

The output/error signal e(n) 28 is also fed back to the main FIR component 30 via the update step-size control 34. The update step-size control 34 includes a multiplier 42, an adaptive coefficient algorithm 44 and a segment weighting unit 48. The output/error signal e(n) 28 is input into an input of the multiplier 42. The output of the multiplier 42 is input into an input of the adaptive coefficient algorithm 44. The output of the adaptive coefficient algorithm 44 is the updated tap coefficient vector A(k). The output of the updated tap coefficient vector A(k) is separated into segments corresponding to the tap segments. Thus the segmented output of the adaptive coefficient algorithm 44 is coupled to multiple inputs of the segment weighting unit 48.

The segment weighting unit 48 has multiple weighting blocks denoted by $W_{\mu x}$. The number of segment weighting blocks equals the number of segments the taps have been seperated into. The output of the multiple weighting blocks is the updated tap coefficient vector A(k) with segment weighting. Thus, the update step-size control 34 outputs the updated tap coefficient vector defined as A(k)=[$A_0$, $A_1$, $A_2$ . . . . $A_N$].

The multiplier 42 includes a step size factor represented by $\mu$. The step size $\mu$ is usually a small positive constant. It should be understood by those skilled in the art that a variable step size $\mu$ could be used. There may be some situations when the adaptive coefficient updates of the taps need to be stopped. For example, the adaptive coefficient updates of the taps may need to be stopped when a local speech signal is present. In this case, the step size $\mu$ may be mathematically reflected as being set to 0. This has the effect of temporarily disabling the adaptive function.

Thus, in the adaptive FIR filter 11 x(n), d(n) and e(n) denote the far-end input signal x(n) 20, the near-end input signal d(n) 26 and the output/error signal e(n) 28, respectively. The adaptive FIR filter 11 is excited by the far-end input signal x(n) 20 and driven by an adaptive algorithm (e.g., a normalized least mean square algorithm (NLMS or LMS)) to produce the estimated echo signal y(n) 36 or replica of the echo signal. The error signal e(n) 28 is then obtained by subtracting this estimated echo signal y(n) 36 from the near-end input signal d(n) 26.

The tap outputs are partitioned into segments, as described above. Weightings W(m) are added to the tap outputs via output segment weighting block 46, as described above. These weightings are applied to the estimated echo signal y(n) to adjust or rescale the estimated echo signal y(n) back to its original amplitude. As a result of the tap storage mode changing, weightings $W_\mu(m)$ are added to the updated tap coefficient vector via segment weighting block 48 of the update step-size control block 34, as described above.

Since the previous envelope amplitude of the tail component taps A(x) is known to be lower, a method of storing the tail component taps with more accuracy can be devised. For example, the tail component taps envelope amplitude can be "normalized" with some weighting following the adaptation algorithm calculation, and then "de-normalized" back with some weighting during the main FIR calculation. It is costly to normalize every tap to the best value, since it will significantly increase the MIPs of the algorithm. Thus in order to achieve high resolution in a less costly manner, the taps can be partitioned into a few segments. The tail component can then be roughly normalized with segment weighting. The tap outputs of each segment can be sub-summated before being multiplied by its respective segment weighting value. Thus, if the number of segments is small enough, then the calculation complexity can be reduced.

Therefore, the main FIR and subtraction equation of the exemplary embodiment is:

$$e(n) = d(n) - \left[ W(1) \sum_{k=0}^{N_1-1} A(k)x(n-k) + W(2) \sum_{k=N_1}^{N_2-1} A(k)x(n-k) + \ldots + W(M) \sum_{k=M-i}^{N} A(k)x(n-k) \right]$$

The taps adaptive update equation (i.e., when using LMS as the adaptive algorithm) is:

$$A_{new}(k) = A_{old}(k) + W_\mu(k)\mu e(n) \times (n-k),\ k=0,\ldots,N;\ m=0,\ldots,S$$

where A(k) denotes the coefficient vector for the taps, $\mu$ is the step size and $W_\mu$ is the segment weighting. There are S+1 segments (i.e., 0–S). It is understood by those skilled in the art that the convergence factor is denoted by $\mu e(n)$ (i.e., the step size $\mu$ multiplied by the output/error signal e(n)).

When the output signal e(n) 28 is not close to the near-end input signal d(n) 26, the adaptation algorithm will be executed to correct or update the tap coefficients so that the estimated echo signal y(n) 36 will gradually approach the near-end input signal d(n) 26 (i.e., the desired signal). The near-end input signal d(n) 26 is unknown and changes all the time. Therefore, the adaptive FIR filter 11 has to be a real time closed loop feedback system adapting all the time to follow the definition of the near-end input signal d(n) 26.

Accordingly, a reduction of the residual echo is obtained. Additionally, the efficiency of the convergence process of the adaptive FIR filter is increased. As a result, a faster reducing rate of the echoes will be observed as compared to a conventional adaptive FIR filter. This means that a faster convergence speed is obtained.

Figure 7:
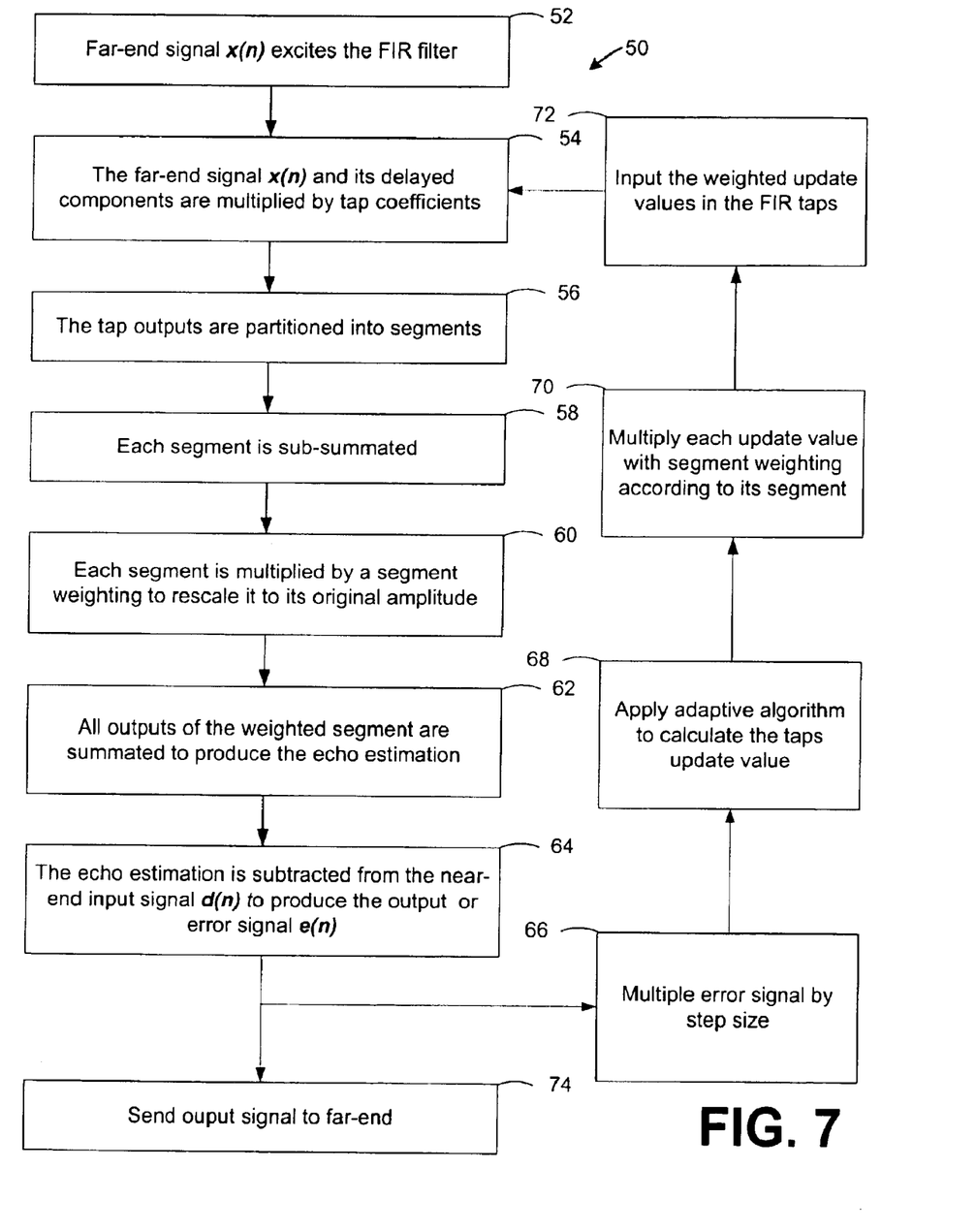
FIG. 7 is a schematic flow diagram showing the basic processing steps in accordance with the present invention.

The method of implementing the adaptive echo cancelling device 10 is now described in detail with reference to FIGS. 6–7. FIG. 7 is a flow diagram 50 schematically presenting the steps of implementing the adaptive echo cancelling device 10 of the present invention.

In the first step of the method of the present invention, shown in FIG. 7 as Step S52, far-end signal is input into the main FIR component 30 of the adaptive FIR filter 11. Next in Step S54, the far-end input signal x(n) 20 is input into a series of delay units. The delay units separate the far-end input signal x(n) 20 into separate components. The separate components of the far-end input signal x(n) 20 are input into the input of the respective multiplier. The updated tap coeficient is input into the other input of the respective multiplier. The multipliers multiply the component of the far-end input signal x(n) 20 (or the delayed component of the far-end input signal x(n) 20) by the respective updated tap coefficients. The resulting outputs are the tap outputs.

Next in step S56, the tap outputs are partitioned into segments. For example, the tap outputs are partitioned into four segments. Two segments may correspond to the head component and two segments may correspond to the tail component. In an exemplary embodiment of the adaptive FIR filter 11, there may be 1600 taps. These taps could be partitioned into the four segments as follows: 0–31, 32–127, 128–383, and 384–1599. It should be understood by those skilled in the art that the number of taps may be increased or decreased depending on the resolution sought. Likewise, the number of segment could be increased or decreased. Further still, the segment partitions could be grouped differently.

Next in step S58, the tap outputs of each segment are sub-summated. The tap outputs of each segment (i.e., 0–31, 32–127, 128–383, 384–1599) is input into the multiple inputs of the respective adders 47 and 49. The adders 47 and 49 sum the inputs. The outputs of the adders 47 and 49 are input to the respective segment weighting blocks.

Next in step S60, each segment weighting block multiplies the sub-summated output of the segment by the segment weighting to rescale the segment to its original amplitude. In essence, the segment weighting in the main FIR component 30 removes the segment weighting added in the update step-size control 34. The segment weighting for each segment weighting block of the main FIR component 30 may be as follows: 1, ¼, ¹⁄₁₆, ¹⁄₆₄.

Next in step S62, the outputs of each segment weighting block are summated to produce the estimated echo signal y(n) 36. Specifically, the outputs of each weighting block are input into the multiple inputs of the adder 40. Adder 40 sums the inputs and outputs the estimated echo signal y(n) 36.

Next in step S64, the output of the main FIR component 30 is compared to the near-end input signal d(n) 26. Next, it is determined whether the signal is close to the near-end input signal d(n) 26 or not. If the signal is not close, then the signal is an error signal e(n) 28. The error signal e(n) 28 is fed back through the update step-size control 34 and multiplied by step-size $\mu$, in step S66.

Next in step S68, the output of step-size $\mu$ is input to the adaptive coefficient algorithm 44. The adaptive coefficient algorithm 44 may be the LMS algorithm. The output of the adaptive coefficient algorithm 44 is the updated tap coefficient vector A(k). The segmented output of the updated tap coefficient vector A(k) is coupled to multiple inputs of the segment weighting unit 48. The segmented output is input to the respective segment weighting blocks. Each segment weighting block multiplies the segmented output of the updated tap coefficient vector A(k), in step S70. The segment weighting for each segment weighting block of the segment weighting block 48 may be as follows: 1, 2, 4, and 8.

Intuitively $W_{\mu(i)}$ should be the inverse of $W_{(i)}$. However, the weightings of the two weighting segments (i.e., the segment weighting blocks in the main FIR component 30 and the segment weighting blocks in the update step-size control 34) may be fine-tuned separately. This can be reflected as optimization by using different step sizes for each segment. That is, the step size $\mu$ with segment weighting is different from the step size $\mu$ without segment weighting. In this manner, the segment weightings can be fined tuned to increase the precision of the tap coefficients for the tail component of the signal.

Next in step S72, the weighted outputs of the updated tap coefficients are fed back to the multipliers of the main FIR component 30 to update the tap coefficients in the multipliers. The update of the tap coefficients will be multiplied against the far-end input signal and the delayed components thereof, as described above. This is shown by the return of the process to step S54. The process continues to loop through steps S54–S72, until in step S64 it is determined that the output of the main FIR component 30 is close to the desired signal. Once it is determined that the signal is close to the desired signal, the process proceeds to step S74. The output/error signal e(n) 28 is then considered an output signal and transmitted to the far-end telecommunication terminal 12b.

An example of the adaptive echo cancelling device 10 implemented on a 16 bit DSP chip follows:

---

Speech Sample Rate: 8 kHz.  Speech Resolution: 14 bit linear (using 16 bit storage).
Acoustic Echo Canceller FIR Tap Length: 1600. (200 ms echo delay)
Taps storage precision: 16 bit.  Adaptive Algorithm: LMS
Number of Segments: 4
Segment partition: 0–31, 32–127, 128–383, 384–1599.
FIR output weighting for each segment (W): 1, ¼, ¹⁄₁₆, ¹⁄₆₄.
Tap update weighting for each segment ($W_\mu$): 1, 2, 4, 8.

---

The present invention increases the precision of the tap coefficients of the tail component relative to the previous known tap amplitude envelope without significantly increasing the computational complexity of the whole algorithm. Thus, the overall performance, including the echo return loss (ERL) and the convergence speed of the echo canceller, is improved. Additionally, the tail component can be saturated without exceeding the previous known envelope amplitude. As a result, the adaptive FIR filter 11 becomes more stable and less likely to diverge.

Although particular embodiments of the invention have been described in detail, it is understood that the invention is not limited correspondingly in scope, but includes all changes, modifications and equivalents coming within the spirit and terms of the claims appended hereto.

For example, it should be understood by those skilled in the art that there may be other components of the adaptive echo cancelling device. These components may include a loss controller, a non-linear processor, a supplementary howling control device or the like. Regardless of these other components, the addition of the segment weightings in the adaptive FIR filter will be applicable.

Furthermore, the two extra segment weightings relate to fix-point taps stored in a memory of the adaptive FIR filter. It should be understood by those skilled in the art that when using such fix-point taps, it does not matter which type of adaptive algorithm is used. Adaptive algorithms, such as LMS, NLMS, RLS, or the like, may be used. Additionally, various strategies or criteria may be used to control the convergence and taps update without departing from the scope of the invention. It should also be understood by those skilled in the art that various strategies or criteria may be used to judge if the output signal is good and whether to send the output signal to far-end. Additionally, although the flow diagram 50 in FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence.

What is claimed is:

1. An echo canceller for reducing the magnitude of an echo occurring in a return channel of a communication device, said echo canceller comprising:
   a processing unit for generating an echo attenuated signal, the processing unit including:
   a) a first input for receiving a first signal that is the precursor of the echo;
   b) a second input for receiving a second signal that potentially contains the echo, and
   c) an output for outputting the echo attenuated signal, wherein the echo attenuated signal is derived by combining the second signal and an adaptation signal, wherein the adaptation signal is generated by normalizing the echo attenuated signal to produce a normalized adaptation signal, and combining the normalized adaptation signal with the first signal to generate an intermediate signal, and the intermediate signal is de-normalized to produce the adaptation signal,
   wherein weighting is added to segments of the intermediate signal to de-normalize the first signal.

2. The echo canceller according to claim 1, wherein the adaptation signal is an estimate of the echo signal.

3. The echo canceller according to claim 2, wherein the estimate of the echo signal is generated by adapting and weighting the echo attenuated signal.

4. The echo canceller according to claim 1, wherein the processing unit is operative to iteratively reduce a difference between the adaptation signal and the echo in the second signal.

5. The echo canceller according to claim 1, wherein the processing unit includes an adaptive filter which generates the echo attenuated signal, the adaptive filter being characterized by a transfer function and the adaptation signal which estimates the echo in the return channel of the communication device causes the adaptive filter to alter the transfer function to iteratively reduce the difference between the adaptation signal and the second signal.

6. The echo canceller according to claim 5, wherein the processing unit includes an updating unit for periodically updating the transfer function characterizing the adaptive fitter to tend to reduce the echo attenuated signal.

7. The echo canceller according to claim 6, wherein the updating unit updates the transfer function on a basis of the echo attenuated signal.

8. The echo canceller according to claim 5, wherein the adaptive filter includes a main FIR component.

9. The echo canceller according to claim 8, wherein the main FIR component includes at least two taps.

10. The echo canceller according to claim 9, wherein the at least two taps are separated into segments to represent at least two components of the first signal.

11. The echo canceller according to claim 1, wherein the processing unit includes an adder, the adder being operative to subtract the adaptation signal from the second signal that potentially contains the echo to generate the echo attenuated signal.

12. A telecommunication device including the echo canceller defined in claim 1.

13. An echo canceller for reducing the magnitude of an echo occurring in a return channel of a communication device, said echo canceller comprising:
   a processing unit for generating an echo attenuated signal, the processing unit including:
   a) a first input for receiving a first signal that is the precursor of the echo;
   b) a second input for receiving a second signal that potentially contains the echo, and
   c) an output for outputting the echo attenuated signal, wherein the echo attenuated signal is derived by combining the second signal and an adaptation signal, wherein the adaptation signal is generated by normalizing the echo attenuated signal to produce a normalized adaptation signal, and combining the normalized adaptation signal with the first signal to generate an intermediate signal, and the intermediate signal is de-normalized to produce the adaptation signal, wherein weighting is added to segments of the echo attenuated signal to normalize the echo attenuated signal.

14. A method for reducing the magnitude of an echo occurring in a return channel of a communication device by generating an echo attenuated signal, comprising:

a) receiving a first signal that is the precursor of the echo through a first input;

b) receiving a second signal that potentially contains the echo from a second input;

c) outputting the echo attenuated signal from an output;

d) combining the second signal and an adaptation signal to derive the echo attenuated signal;

e) generating a normalized adaptation signal by weighting segments of the echo attenuated signal to normalize the echo attenuated signal;

f) generating an intermediate signal by combining the first signal and the normalized adaptation signal; and g) de-normalizing the intermediate signal to produce the adaptation signal by weighting segments of the intermediate signal with the segment weights applied to the echo attenuated signal.

15. A method as defined in claim 14, wherein combining the second signal and the adaptation signal includes subtracting the adaptation signal representing an echo estimate from the second signal that potentially contains echo to generate the echo attenuated signal.

16. A method as defined in claim 14, further including the step of iteratively reducing a difference between the adaptation signal and the echo in the second signal.

17. A method as defined in claim 14, further including adapting the echo attenuated signal to generate the normalized adaptation signal.

18. An echo canceller for reducing the magnitude of an echo occurring in a return channel of a communications device by adaptive filtering, comprising:

a plurality of filter taps that each generate a historical sample of a far end input signal and each filter tap weights the historical sample using a coefficient value corresponding to the filter tap, wherein outputs of the filter taps are partitioned into plural segments;

a segment weighting unit having a combiner for each segment of filter tap outputs, each combiner combines the filter tap outputs of the associated segment, and wherein the segment weighting unit weights each combined filter tap output with a weighting value associated with the corresponding segment; and at least one combiner for combining the weighted and combined filter tap outputs for each segment and a near end input signal to generate an output/error signal.

19. The echo canceller according to claim 18, further comprising an update step size control that generates the coefficient values with an adaptive coefficient algorithm, partitions the coefficient values into segments corresponding to the segments of the filter tap outputs and weights each segment of coefficient values.

20. The echo canceller according to claim 19, wherein the weights applied to the segments of the coefficient values are the same as the corresponding weights applied to the combined filter tap outputs.

21. The echo canceller according to claim 19, wherein the update step size control adjusts at least one of the coefficient values and at least one of the weights for the segments of coefficient values based on the output/error signal.

22. The echo canceller according to claim 19, wherein at least one of the segments has a different step size than another of the segments.

23. The echo canceller according to claim 18, wherein the combiners of the segment weighting unit sum the filter tap outputs of the corresponding segments.

24. The echo canceller according to claim 18, further comprising an additional filter tap that weights the far end input signal without historical sampling of the far end input signal, the output of the additional filter tap included in one of the segments of filter tap outputs.

25. The echo canceller according to claim 18, wherein at least one of the segments has a different number of filter tap outputs than another of the segments.

26. The echo canceller according to claim 18, wherein at least one segment includes filter tap outputs associated with a head component and at least one segment includes filer tap outputs associated with a tail component.

* * * * *